US007657468B1

(12) United States Patent
Whiteley et al.

(10) Patent No.: US 7,657,468 B1
(45) Date of Patent: Feb. 2, 2010

(54) METHOD FOR CONTINUOUS ASSET VERIFICATION

(75) Inventors: Thomas G. Whiteley, Houston, TX (US); Wilson S. Wimberley, Houston, TX (US); Bryan Lane, Houston, TX (US)

(73) Assignee: PPI Technology Services, LP, Houston, TX (US)

( * ) Notice: Subject to any disclaimer, the term of this patent is extended or adjusted under 35 U.S.C. 154(b) by 0 days.

(21) Appl. No.: 11/761,232

(22) Filed: Jun. 11, 2007

Related U.S. Application Data (63) Continuation-in-part of application No. 10/277,531, filed on Oct. 22, 2002, now Pat. No. 7,603,296.

(51) Int. Cl.
*G06Q 10/00* (2006.01)

(52) U.S. Cl. .................... 705/28; 701/213; 701/209; 340/10.6; 340/10.34; 340/10.51; 700/115

(58) Field of Classification Search .................. 705/28, 705/32; 235/385, 383, 384, 492; 340/572.1, 340/572.9, 928, 933, 10.34, 10.51, 572.4, 340/572.5, 825.4, 539.1, 572.8; 700/215, 700/225, 229; 701/213, 209, 211
See application file for complete search history.

(56) References Cited

U.S. PATENT DOCUMENTS

| | | | | |
|---|---|---|---|---|
| 4,750,197 A | * | 6/1988 | Denekamp et al. | ........ 455/404.2 |
| 5,648,767 A | * | 7/1997 | O'Connor et al. | ........... 340/928 |
| 5,710,932 A | * | 1/1998 | Hamanaka et al. | ............. 712/14 |
| 5,850,187 A | * | 12/1998 | Carrender et al. | .......... 340/10.6 |
| 5,971,587 A | * | 10/1999 | Kato et al. | .................. 700/115 |
| 6,208,910 B1 | * | 3/2001 | Michael et al. | ............. 700/225 |
| 6,275,153 B1 | | 8/2001 | Brooks | |
| 6,333,699 B1 | | 12/2001 | Zierolf | |
| 6,333,700 B1 | | 12/2001 | Thomeer et al. | |
| 6,346,884 B1 | * | 2/2002 | Uozumi et al. | ........... 340/572.1 |
| 6,897,827 B2 | | 5/2005 | Senba et al. | |

(Continued)

OTHER PUBLICATIONS

Business Editors/Technology Writers Intermodal Transport and Logistics 2002 Conference and Exposition. (Dec. 12, 2002). PAR Logistics and Savi Technology Team up to Improve Cargo Container Security for U.S. Government Agencies :[1]. Business Wire,1. Retrieved Nov. 20, 2009, from Business Dateline.*

(Continued)

*Primary Examiner*—Matthew S Gart
*Assistant Examiner*—Olusegun Goyea
(74) *Attorney, Agent, or Firm*—Buskop Law Group, PC; Wendy Buskop (57) ABSTRACT

A method for continuous asset verification using at least one radio frequency identification tag for at least one piece of well equipment comprising: writing information about the well equipment into a transportable data storage device; engaging the transportable data storage device with a controller forming a smart controller; encoding the information onto at least one radio frequency identification tag; removably attaching the radio frequency identification tag to the well equipment; transporting the well equipment with the smart controller to a site and scanning the well equipment with the smart controller during at least one predefined interval during transport; and writing the stored scanned radio frequency identification tag information from the transportable data storage device to data storage in communication with a third processor.

15 Claims, 4 Drawing Sheets

U.S. PATENT DOCUMENTS

| | | | | |
|---|---|---|---|---|
| 7,036,729 B2 * | 5/2006 | Chung | ................. | 235/385 |
| 2002/0185532 A1 * | 12/2002 | Berquist et al. | ............. | 235/385 |
| 2003/0149526 A1 * | 8/2003 | Zhou et al. | ................. | 701/213 |
| 2003/0209601 A1 * | 11/2003 | Chung | ................. | 235/385 |
| 2004/0000997 A1 * | 1/2004 | Stevens, III | ............. | 340/572.1 |
| 2004/0036623 A1 * | 2/2004 | Chung | ................. | 340/825.49 |
| 2004/0143505 A1 * | 7/2004 | Kovach | ................. | 705/23 |
| 2005/0065682 A1 * | 3/2005 | Kapadia et al. | ............... | 701/35 |
| 2005/0248459 A1 * | 11/2005 | Bonalle et al. | ........... | 340/572.8 |
| 2006/0259238 A1 * | 11/2006 | Jung et al. | ................. | 701/209 |

OTHER PUBLICATIONS

Business Editors. (Dec. 12). PAR Logistics and Savi Technology Team up to Improve Cargo Container Security for U.S. Government Agencies. Business Wire,1. Retrieved Nov. 20, 2009, from Business Dateline.*

Pete Barlas Staff writer. (Aug. 25, 1997). Savi receives $11M to track military supplies. The Business Journal, 15(17), 19. Retrieved Nov. 20, 2009, from Business Dateline.*

Daniel Verton. (Apr. 26, 1999). In-transit visibility. Federal Computer Week, 13(12), 18, 22. Retrieved Nov. 20, 2009, from ProQuest Computing.*

* cited by examiner

METHOD FOR CONTINUOUS ASSET VERIFICATION

CROSS REFERENCE TO RELATED APPLICATION

This patent application is a continuation-in-part application that claims the benefit, under 35 USC §120, of the prior non-provisional application Ser. No. 10/277,531, which was filed Oct. 22, 2002. The prior co-pending non-provisional application is incorporated by reference along with its appendices.

FIELD

The present embodiments relate to a method for continuous asset verification using at least one radio frequency identification tag for at least one piece of well equipment and periodic scanning during transport of the well equipment.

BACKGROUND

A need exists for a method for verifying the safe transport of well equipment to a site that can detect changes in the contents of a shipment, deviations from a trip plan, movement of an item from beyond an electronic planned route, or "picket fence" and reduce potential tampering of equipment, loss or destruction of equipment, and theft.

A further need exists for a method for verifying the safe storage of well equipment with an ability to detect loss or theft of one or more items during regular scanning or reading of radio frequency identification tags on well equipment.

A need exists for a method for continuous asset verification that can be performed in a continuous and automated fashion, allowing items to be tracked at predefined intervals, or continuously throughout transport, and providing a report to at least one user during or at the completion of the transport.

A need exists for a method for continuous asset verification that utilizes a smart controller, able to quickly and efficiently verify and match information encoded into a removable data storage device.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

One advantage of the present method is that the present method is able to efficiently and quickly identify well equipment and other items transported in a shipping device and verify the presence of the items at intervals during transport. This method enables products to be processed rapidly through customs checkpoints, saving time and related shipping costs because of the ease of access of the data and the ability of the conjunctive use of a smart controller with encoded radio frequency identification tags to verify continuously the presence of and, optionally, specifications of the well equipment.

The present method enables the detection of any deviation of one or more pieces of well equipment being transported from a predetermined trip plan. The present method allows for the detection and prevention of tampering, unauthorized or illegal use, loss, or theft of any transported items, saving the time and costs associated with lost assets.

The present method can also save lives and prevent property damage. For example, a terrorist may attempt to destroy a well site by tampering with equipment during transport, and the tampering can be detected using the present method. Additionally, a terrorist attempt to destroy a drilling rig offshore, such as by planting explosives, can be detected and prevented through use of the present method to monitor the progress of well equipment during transport.

The present method additionally can utilize reusable radio frequency identification tags which can be encoded with information, then removed for future use once a piece of well equipment reaches its destination. Thus, the costs associated with the present method and all required materials are relatively inexpensive, and "environmentally friendly" while being extremely effective and efficient.

The present embodiments relate to a method for continuous asset verification using at least one radio frequency identification tag such as an iQ8 Active Tag, made by Identec Solutions of Toronto, Canada, for at least one piece of well equipment during transport, storage, when at a point of origin or destination, or combinations thereof.

Well equipment can include many types of well pumps, mud pumps, masts for derricks, meters, and other items of manufacture.

Well equipment can include surface wellheads, manual or actuator operated outlet valves, handwheels for valves, valve actuators, blind flanges, pressure gages, spools, tees, crosses, crossover flanges and equipment, lubricators, stuffing and packing boxes, ring gaskets, slips and hangers, studs and nuts, packing materials, packers, replacement equipment such as gates and seats, valve sealent, valve stem packing, or valve release plugs.

Well equipment can further include a piece of blowout preventer equipment, such as rams, control modules, inline blowout preventer units, inside blowout preventers, and blowout preventer closure members.

Well equipment can include land well structures and related parts, such as a modular land based oil derrick, casing, cement shoes, tubing, downhole packers, centralizers, cement and cementing equipment, hydraulic fracturing equipment and materials such as propant, gelling agents, pumps, mixers, water, control units, power supplies, and storage tanks. Acidizing materials and equipment, such as control units, power supplies, pumps, and storage tanks are also contemplated.

Well equipment can include a completion tool, such as a packer, a screen, or formulation simulation equipment and materials, such as a Frac pump from RI services or Halliburton, or a drilling tool, such as a drill bit, a mud motor, or an amine scrubber and equipment.

Well equipment can further include a buoy, such as a Spa{tm} buoy, or a well completion assembly, such as a well screen. It is also contemplated that well equipment can include an oil or gas rig motor, such as one made by Compressor Systems Inc of Midland, Tex., an oil or gas meter, monitor or cleaning device, such as a wireline pig made by Baker Atlas of Houston, Tex., a piece of gas compression equipment, such as a compressor and prime mover, or a generator and prime mover, such as a Hanover compressor, from various sources including Germany, which can include a portable electric generator, a piece of dehydration equipment, a heater treater, or a piece of process water equipment, such as a heat exchanger.

Wellhead equipment can also include subsea wellhead housing, including a subsea wellhead or christmas tree. Subsea wellhead caps and running and retrieving tools and equipment are also contemplated. Subsea and mudline hanger running tools, subsea rental tools including remotely operated vehicles and related equipment for valve operation, and subsea trees including subsea control valves, on-platform control equipment, and chokes are further contemplated.

Well equipment can also include manufactured raw materials, such as bars of steel, stainless steel, or nickel-based alloys, or tubulars, such as pipe and casing.

Well equipment can further include junction plates and terminations, leads and jumpers for umbilicals, mudline hanger equipment, corrosion caps and clean out tools, cameras, such as downhole cameras, remotely operated vehicle tools, and safety valves, including surface and subsurface tubing and wireline retrievable safety vales.

Possible well equipment can also include pup joints, such as tubing, drill pipe, or riser pup joins, flow couplings and flow pups, landing nipples, tubing head adapters, tree adapters, slips and packoffs, chokes, including adjustable and positive chokes, double pin subs, inline ball valves, companion flanges, tubing hangers, measurement/logging while drilling tools, stabiliziers, drilling jars, and bottomhole assemblies.

Well equipment can also include storage tanks and associated equipment. Production equipment such as separators, treaters, gunbarrels, valves, sucker rods, gas lift valves and mandrels, electric and rod-actuated rotating downhole pumps, polished rods, pumpjacks and hydraulic pumping units, prime movers, downhole sucker rod pumps, surface water pumps, downhole pump anchors, manifold equipment, water and gas injection equipment for disposal or enhanced recovery, surface flowlines, and chemical injection equipment are also contemplated.

Surface site facilities, such as trailers, skid mounted buildings, work buildings, skid mounted generators, safety equipment, cranes and hoisting equipment, slings, welding equipment, corrosion alleviation equipment, and communication equipment are contemplated.

Well equipment can further include offshore platform structures, including production and drilling risers, radio communication equipment, weather equipment, safety forecasting equipment, escape boats, engines and generator equipment, fire suppression equipment, and other similar equipment. Logging equipment, which can include radioactive sources, is also contemplated for enhanced security and protection through use of the present method.

As part of the method, information about the well equipment and other information relating to one or more pieces of well equipment to be transported is written into a transportable data storage device, such as a jump drive having sufficient storage, using a first processor. Other information can include a work order number, a job site address, the name of a foreman to receive an order, or similar shipping information. The information can also include freight forwarder information and other transport information, such as a planned route, email notification lists, shipment criticality level, which indicates the priority code of the shipment—high, medium, low, or some other level, an average speed of travel, expected time of arrival, name of driver, name of trucking company, serial number of truck or ship, or registration number or other identification of the truck or ship.

The transportable data storage device can be an external memory storage device, such as a universal serial bus memory stick, an internal memory storage device, such as a computer hard drive, or combinations thereof. A Sony, Lexar, Sandisc, a PNY, a BUSLINK, a Seagate, Hitachi, a Fujitsu, a Western Digital, or another similar external memory storage device can be used herein.

It is contemplated that in an embodiment, the transportable data storage device can be adapted to be wireless, and can transmit and receive information using e-mail and packet inter-network grouping systems, which can include IEEE standards 802.11 and 802.15 and BlueTooth™.

The transportable data storage device is engagable with a controller, which can be a scanner, such as a PPI asset controller, model 0001 made by PPI Technology Services of Houston, Tex.

When the transportable data store device is engaged with the controller, a smart controller is formed that can perform a variety of actions. Specifically the smart controller can scan or read specific radio frequency identification tags relating to the information on the transportable data storage device. The controller is contemplated to have a second processor for connecting to the data storage device. The controller can also retrieve information from the RFID tags, convert information from the RFID tags, monitor new RFID tags added to a shipment, provide reports on information from the RFID tags, determine the current location of the smart controller using a global positioning system device, provide notices and alarms by email, cellular or BlueTooth networks, or other information transfer systems, including the Internet, and sense shock or vibrations during transport using an accelerometer, such as those made by Fisher Scientific having an office in Houston, Tex.

The one or more pieces of information that describe or are associated with the well equipment can include serial numbers for specific pieces of pipe or equipment, or product descriptions such as the size, weight or color of the products. The information can be encoded onto one or more radio frequency identification tags, such as an iQ8 Active Tag made by Identec Solutions of Toronto, Canada, using the first processor, the second processor of the controller, or combinations thereof, forming an encoded radio frequency identification tag.

In is contemplated that the radio frequency identification tags can be tamper resistant, for added security and durability. A tamper resistant RFID tag would be one, such as those made by AeroScout of San Mateo, Calif.

In another embodiment, the controller can be used to prevent tampering with the RFID tags using an internal or external alarm or emergency notification system, wherein the controller can call or contact a user or administrator, send a text message, or send email using a cellular network when the well equipment is moved or when the well equipment deviates from the trip plan. Similarly, a switch can be installed on the RFID tags that provide an alarm to the controller when the well equipment is moved or if the RFID tag is removed from the equipment.

In yet another embodiment, it is contemplated that the radio frequency identification tags can be serialized, and the serial numbers can be recorded in the transportable data storage associated with the controller, to provide two simultaneous confirmations of the encoded RFID tags at a storage or delivery site after transport. This simultaneous confirmation is an unexpected benefit, that allows for rapid verification of a load, and that is faster than verifications performed in a sequential manner.

When the encoded radio frequency tag is removably attached to a piece of well equipment, a piece of traceable well equipment is created that can be detected en route by the smart controller.

The traceable well equipment and the smart controller can then be transported to a site in a shipping device, such as an equipment basket or a shipping container that meets a standardized shipping ASTM size of 8 feet by 40 feet, an ISO standard, and other containers for a truck, a ship, an aircraft, a train, or other similar transportation means. A shipping device can meet an API 8C standard, as indicated by the 2007 American Petroleum Institute standards. The shipping device should meet a defined shipping size and standard, such as the standards stated in the British standard, BS EN 12079, or the international standard DNV 2.7-1.

The shipping device can include a shipping module, a box, a crate, a basket, or a standardized intermodal shipping container. Any number of identical or different kinds of shipping devices can be used to transport any quantity or type of well equipment.

The controller can include a mounting bracket sensor located on a mounting bracket, that can be used to secure the smart controller to one or more of the pieces of well equipment for added stability and security.

The mounting sensor can include a contact switch or proximity sensor. The mounting bracket can be the same size as the controller housing, or slightly larger or smaller, such as +/−30% in size.

Destination sites can include well locations having one or more hydrocarbon wells, water wells, injection wells, such as disposal wells, enhanced recovery injection wells, or combinations thereof.

Destination sites can include work sites, such as sites with assembled parts for unfinished wells, or manufacturing locations or assembly locations, such as locations where well parts are manufactured or assembled.

It is also contemplated that a destination site can include a storage area for long term storage, a holding area for short term storage, or a transport vehicle, such as a ship, boat, barge, train, car, truck, or aircraft.

During transport to the site, the smart controller periodically or continuously scans or reads the traceable well equipment, which can be in a shipping device.

If not scanned continuously, the smart controller can scan the traceable well equipment at one or more predefined intervals, such as every 30 minutes, every hour, or every 6 hours, or every 12 hours, or at intervals ranging from 0.1 second to 60 seconds, throughout transport, to detect and store the information from the encoded radio frequency identification tags in the transportable data storage device, forming stored scanned radio frequency identification tag information.

The information obtained from the radio frequency identification tags can be written into the transportable data storage.

The information in the transportable data storage can then be written to a third processor, which can be located at the site where the well equipment is to be delivered or at an intermediate site, for prevention of fraud during transport and to insure validation that the load has not been tampered with.

The information can be accessed by the third processor to verify the successful transport of traceable well equipment without deviation, loss, or tampering. In an embodiment, the third processor can have in memory, or the transportable data storage device can contain, additional computer instructions for instructing the third processor to generate a report relating to the stored scanned radio frequency identification tag information for use by another party, such as a foreman, the user, or an administrator at the site or at a remote location. This report can be transferred by satellite or another kind of network for use by a plurality of users connected on a network.

The third processor can be located at the destination site or at an intermediate site. It is contemplated that the third processor can be in any location and be in wireless communication with the smart controller, such as via a cellular network, wherein the third processor calls the smart controller over a cellular network, as one would phone another cellular device.

In an embodiment, a fourth processor can be remote from the site while the third processor is located on site. The third processor and the fourth processor can be connected by a network so that the smart controller can communicate between the third processor and the fourth processor instantaneously. It is contemplated that any number of processors, located on site or remote from the site, can be in communication with the smart scanner or with each other processor via a network. For extremely fast conveyance of information, it is contemplated that the smart controller can communicate to the third and fourth processors through two different gateway protocols simultaneously.

Following the transport of the well equipment, the present method can include removing the encoded radio frequency identification tags for reuse, which is an environmentally correct practice that is not currently done in the oil and natural gas industry.

It is also contemplated that the controller's second processor can have memory with sufficient capacity to contain a copy of the information being loaded and contained on the transportable data storage.

It is contemplated that the this method can be used in conjunction with a toll service or border inspection service, so that trucks can move, in the manner of an "EZ PASS" across state lines, enabling truckers to continue driving without stopping at a border station. In this embodiment, the third processor can be a government processor that reads the RFID tags, or the smart controller can specifically transmit the information relating to the well equipment to the third processor at the border station or at the government agency site, enabling fast transport of the well equipment without additional paperwork needing to be filled out or stopping of the transport. This is a noteworthy advantage of the present method.

In a contemplated embodiment, the information relating to the well equipment can be a limited amount of information for a fast communication between the smart controller and the third processor, a fourth processor located remote from the well equipment, such as at a centralized location that can be a site or office of an administrator of the transport process, which can be miles from the well site. Any combination of remote or on-site processors can be in communication and receive the limited information from the smart controller.

The fourth processor can be remote from the controller or the transportation route, such as at a home office of a manager in communication with the smart controller through a wireless, cellular, or a satellite link.

The limited information can include from three to five components of information, which can include a part number, size of equipment, job number, serial number, brand name, color, material, chemical composition, other similar information, and combinations thereof.

The limited information could include, in another embodiment, from one to 100 or more distinct pieces of information.

The "limited information" is only limited by the amount of data each radio frequency identification tag can hold, and the number of RFID tags used in performing the present method. Any number of RFID tags could be used to label a piece of well equipment. As processing and data storage capacity increases, the quantity of data or pieces of information that is quickly transferable will also increase. It is contemplated that the information installed on the RFID tags is limited only so that it can be transferred very quickly, in fewer than ten minutes, more preferably in fewer than three minutes, and even more preferably in fewer than two minutes.

It is also contemplated that the limited information can include a trip plan relating to the well equipment. A trip plan is a predetermined route, including stopping places, fueling stops, hotels for the driver, maintenance stops, additional pick up locations, airport load and offload zones, train load and offload areas, ports, ship deck locations, origin and destination locations, allocated time per segment and allocated overall time of the trip, and combinations thereof.

In an embodiment, the smart controller can include a global positioning system transceiver, such as a Garmin™ GPS or a Tom Tom™ GPS. The data storage in the smart controller can include computer instructions for instructing the second processor of the smart controller to use the global positioning system transceiver to synchronize coordinates received by the global positioning system transceiver to the trip plan. The second processor of the smart controller can then provide at least one time stamp including a time and set of coordinates for the well equipment during transport.

It is further contemplated that the data storage in communication with the third processor can contain computer instructions for instructing the third processor to provide a notification to a user that the RFID tagged well equipment has deviated from the trip plan.

Figure 1:
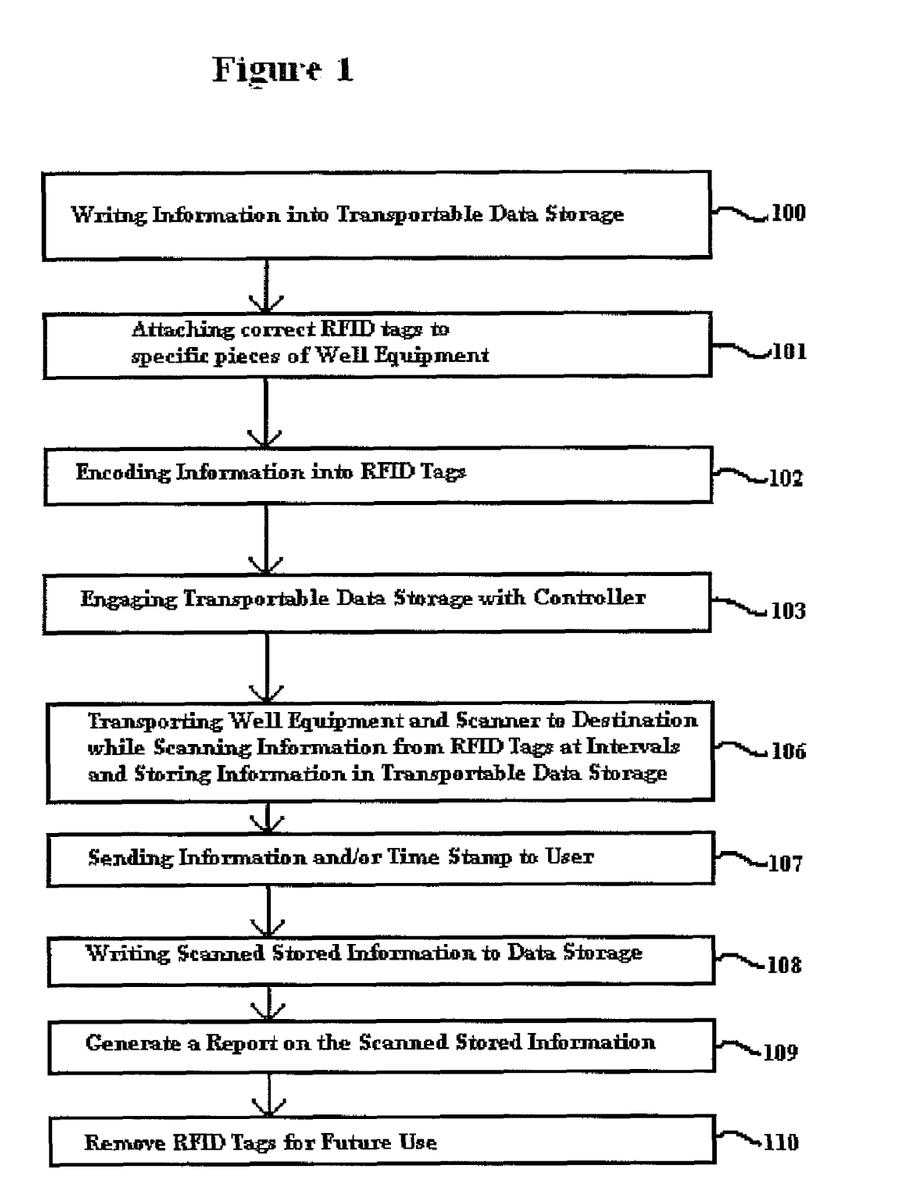
FIG. 1 depicts a flowchart showing an embodiment of the present method.

Referring now to FIG. 1, a flowchart depicting the steps of an embodiment of the present method is shown.

The depicted embodiment the present method begins by writing information into a transportable data storage (100). This step can include transferring computer data relating to one or more pieces of well equipment to the transportable data storage using a computer, a wireless connection, or other similar means.

The depicted embodiment then includes keying a specific identification number into radio frequency identification tags as they are manufactured, and then attaching the correct RFID tags to specific pieces of well equipment (101).

For this embodiment, the next step involves encoding information into one or more radio frequency identification tags (102). The encoding can be performed using any standard encoding or encryption method, such as 128 bit American Encryption Standard. This encoding step forms traceable well equipment.

The depicted embodiment of FIG. 1, then includes engaging the transportable data storage with a controller (Step 103) forming the smart controller.

This step (103) can be performed by physically or wirelessly connecting the transportable data storage medium to the controller, such as by inserting the data storage medium into a complementary port on the controller, or by using a wireless connection. This step forms a smart controller. The smart controller can scan radio frequency identification tags for information that matches the information contained on the transportable data storage medium.

It is contemplated that in yet another embodiment, not shown, the transportable data storage can be engaged with the controller (103), forming a smart controller, after writing information into the transportable data storage (101). Then, the step of encoding the RFID tags (102) and attaching the correct RFID tags to a specific piece of well equipment (101) can be performed.

The depicted embodiment of FIG. 1, then includes transporting the well equipment and controller to a destination while scanning or reading information from the radio frequency identification tags at intervals and storing the information in the transportable data storage medium (106). The intervals at which the radio frequency identification tags are scanned can be continuous, extremely infrequent, or have any varying degree of frequency as necessary to monitor the transport of the traceable well equipment.

The depicted embodiment includes the optional step of sending the information and/or a time stamp to a user (107). This can include time and global positioning system coordinate information, or any information relating to the transit of the traceable well equipment.

The depicted embodiment also includes writing the scanned stored information to data storage (108), such as a data storage in communication with a separate processor. The stored information can then be accessed and viewed by a user, such as by using a computer, a cellular telephone, a personal digital assistant, or at least one other similar device.

The depicted embodiment further includes the optional step of generating a report on the scanned stored information (109). The report can be generated using a printer in communication with a processor, or the report can be generated on a screen of a device having a display, such as a computer, a cellular telephone, or a personal digital assistant.

The depicted embodiment concludes with the optional step of removing the radio frequency identification tags for future use (110). The ability to reuse the RFID tags saves a tremendous amount of expense otherwise associated with "one way" RFID tags and avoids the negative environmental impacts created by the disposal of RFID tags that are not reuseable.

Figure 2:
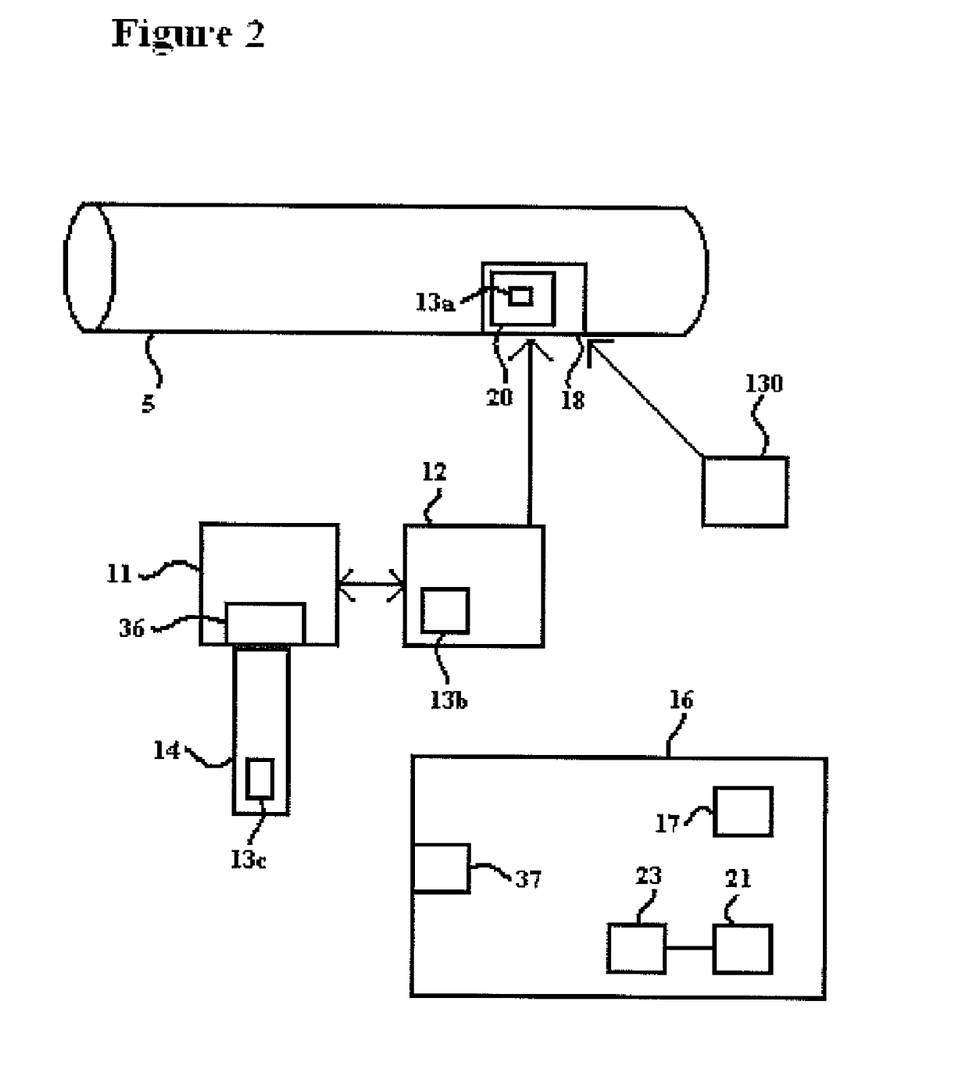
FIG. 2 depicts a diagram showing the parts of a system useable with the present method.

Referring now to FIG. 2, a diagram of the parts of a system useable with an embodiment of the present method.

FIG. 2 depicts well equipment (5) having a radio frequency identification tag (18) attached thereon. While well equipment (5) is depicted as a single tubular, well equipment (5) can be any type or quantity of well equipment or structures that can be transported to a site.

Radio frequency identification tag (18) has radio frequency identification tag data storage (20), which when encoded contains information (13a) relating to well equipment (5) forming traceable well equipment.

A first processor (11) is shown in communication with first processor data storage (12). First processor data storage (12) contains information (13b) relating to well equipment (5). The first processor (11) further has a USB interface (36), or another removable data storage interface, for connecting to the transportable data storage (14).

A controller (16) is shown in communication with a power source (17), which can be any kind of power source including AC/DC power sources, one or more rechargeable or non-rechargeable batteries or fuel cells, a solar battery, or other similar power sources.

Controller (16) is also shown in communication with a second processor (21) having memory (23) and in communication with a removable data storage interface (37) for engaging the transportable data storage (14) after the transportable data storage (14) has engaged the first processor (11) and received the information (13b). Information (13b) is contemplated to be a copy of information (13a) stored on the radio frequency identification tag (18).

Transportable data storage (14) is shown containing information (13c) relating to well equipment (5) which is a copy of information (13a) stored on the radio frequency identification tag (18) and information (13b), stored in data storage (12).

First processor (11) is depicted as engaging with transportable data storage (14) through USB interface (36). First processor (11) can transmit information (13b) to both radio frequency identification tag data storage (20) and transportable data storage (14) simultaneously or sequentially, through any direct or wireless means.

FIG. 2 also shows that a fifth processor (130) can be used for loading the at least one piece of information onto the at least one radio frequency identification tag.

Figure 3:
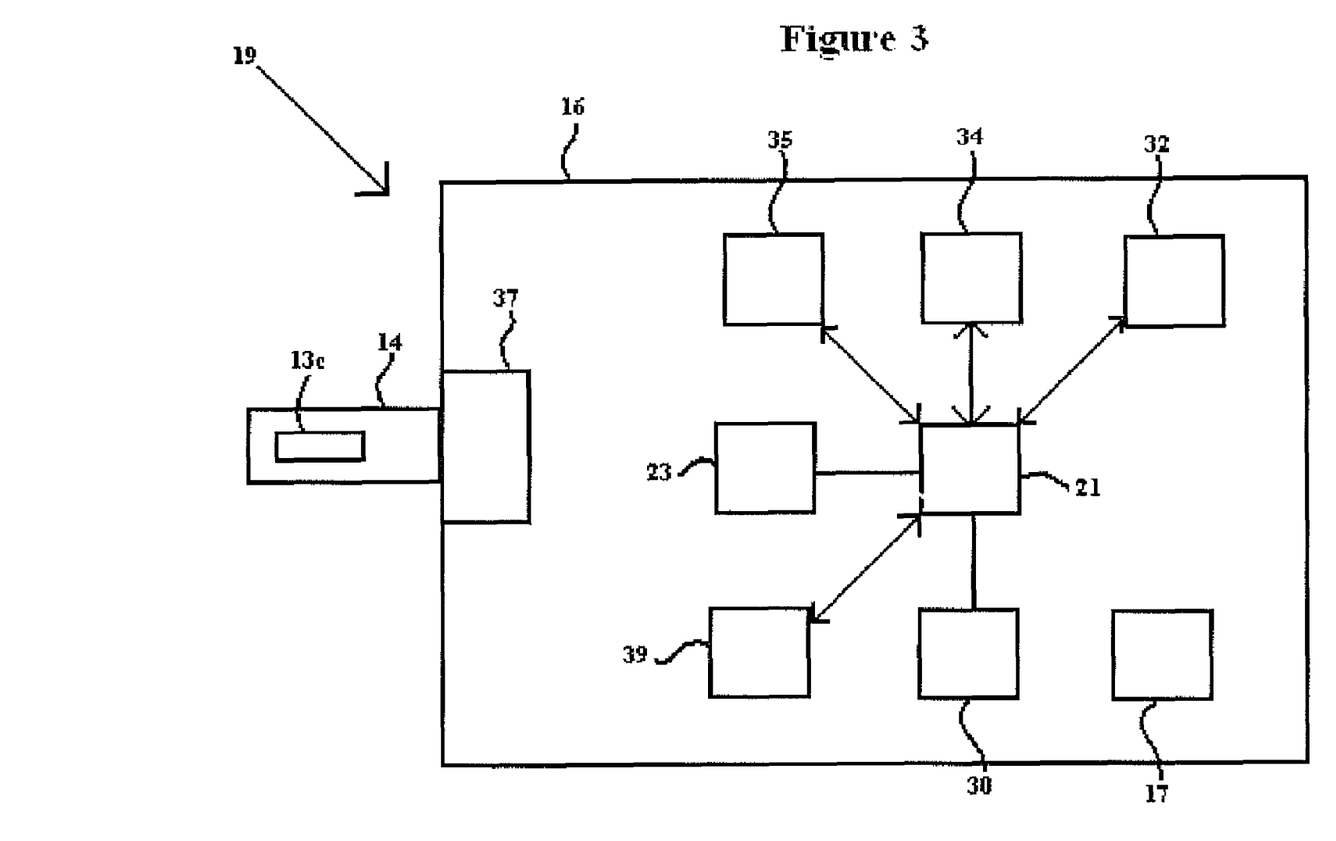
FIG. 3 depicts a diagram showing selected parts of the system of FIG. 2 assembled to form a smart controller.

Referring now to FIG. 3, a diagram is shown, depicting selected parts of the system of FIG. 2 assembled to form a smart controller.

Smart controller (19) is shown wherein the controller (16) engages the transportable data storage (14) with the information (13c) relating to the well equipment. The smart controller (19) can contain a GPS transceiver (30), a RFID reader/writer (32), such as an Identec reader writer, a satellite transmitter/receiver (34), or any combinations thereof. A cellular transceiver (35) is depicted within the smart controller (19). Each component within the smart controller (19) is in communication with the second processor (21). A wireless chip set (39) can also be installed in the smart controller (19) for communication with the second processor (21).

The smart controller (19) can include a single unit that can perform both cellular and satellite communications.

FIG. 3 also depicts power source (17) for supplying power to smart controller (19).

Figure 4:
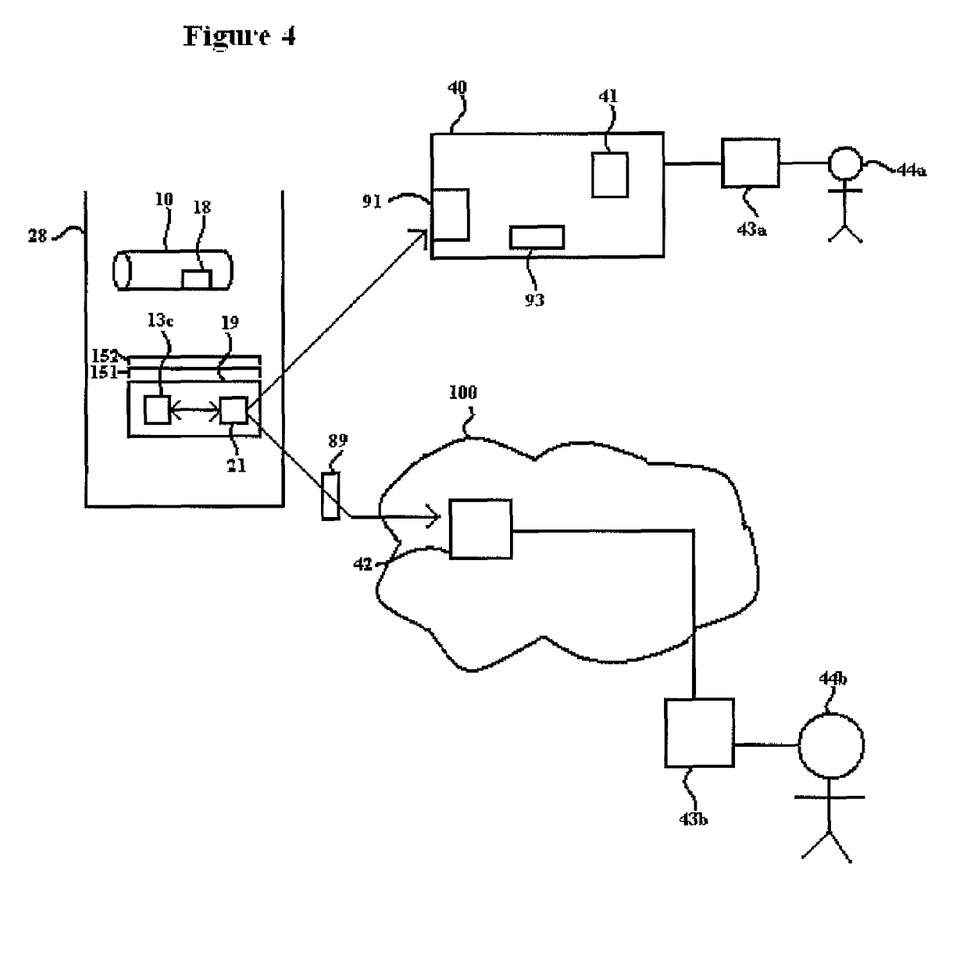
FIG. 4 depicts a diagram showing the parts of the system of FIG. 2 in communication with remote processors.

FIG. 4 depicts a piece of well equipment as traceable well equipment (10), because the RFID tag (18) with information relating to the well equipment has been attached to the well equipment, allowing the well equipment to be traceable. In this embodiment, FIG. 4 depicts a mounting bracket sensor (151) for a mounting bracket (152) for securing the smart controller to the traceable well equipment.

The mounting sensor can include a contact switch or proximity sensor. The mounting bracket can be the same size as the housing for the smart controller (19), or slightly larger or smaller, such as +/−30% in size.

The well equipment can be placed into a shipping device (28), which can be any kind of shipping means including containers for transport on ships, aircraft, cars, trains, and other similar means. Shipping device (28) is depicted as a shipping module or basket for carrying the traceable well equipment (10) with the smart controller (19).

Smart controller (19) scans the traceable well equipment (10) at periodic intervals during transport and transmits information received from scanning or reading of the RFID tag (18) into the transportable data storage engaged with the smart controller (19).

Once the traceable well equipment (10) reaches a destination site, the second processor (21) of smart scanner (19) can communicate with a third processor (40) at the well construction site. The third processor has another data storage interface (91) for receiving the transportable data storage and enabling downloading of the information to the data storage (41) of the third processor. The third processor (40) can further have a wireless chip set (93) for wireless communication with the second processor (21). Use of a wireless chip set (93) can also enable the present method to utilize a third processor (40) that is remote from the well site.

The third processor can have a display (43a). Display (43a) can be viewed by a user (44a) to monitor the status of traceable well equipment (10) instantaneously and in real time at the site.

A fourth processor (42) is also depicted in communication with the second processor (21) via a protocol gateway (89) to a network (100). The fourth processor (42) can be remote from the well site, such as an administrator's computer 100 miles from the site.

The fourth processor can have a display (43b). Display (43b) can be viewed by a second user (44b) to monitor the status of traceable well equipment (10) instantaneously and in real time, remote to the site. Additionally, the user and second user can monitor the information simultaneously.

Display (43a) or display (43b) can be a computer monitor, a screen on a cellular telephone or personal digital assistant, or any other type of display or graphical user interface.

While these embodiments have been described with emphasis on the embodiments, it should be understood that within the scope of the appended claims, the embodiments might be practiced other than as specifically described herein.

What is claimed is:

1. A method for continuous asset verification using at least one radio frequency identification tag for at least one piece of well equipment during transport, storage, when at a point of origin or destination, or combinations thereof, comprising the steps of:

writing at least one information for a first piece of well equipment into a transportable data storage device using a first processor, wherein the at least one information further comprises a trip plan;

installing the transportable data storage device, with the at least one information for the first piece of well equipment into a controller, forming a smart controller, wherein the smart controller comprises a second processor and a global positioning system transceiver;

encoding at least one specification information using the first processor or the second processor onto data storage of a radio frequency identification tag forming an encoded radio frequency identification tag;

removeably attaching the encoded radio frequency identification tag directly to the first piece of well equipment forming a traceable well equipment;

transporting the traceable well equipment with the at least specification information with the smart controller to a site and scanning the traceable well equipment during at least one predefined interval or continuously with the smart controller during transport to detect encoded radio frequency identification tag and to store the encoded radio frequency identification tag information in the transportable data storage device;

wherein the smart controller communicates between a third processor and a fourth processor connected by a network for instantaneous communication;

writing the stored scanned radio frequency identification tag information from the transportable data storage device to data storage in communication with a third processor;

instructing the second processor to use the global positioning system transceiver to sync coordinates received by the global positioning system transceiver to the trip plan and provide at least one time stamp for the traceable well equipment during transport, wherein the time stamp comprises a date, a time, and a set of coordinates; and instructing the third processor to provide a notification to a user that the traceable well equipment deviated from the trip plan.

2. The method of claim 1, wherein the third processor further comprises computer instructions for instructing the third processor to generate a report on the stored scanned radio frequency identification tag information.

3. The method of claim 1, wherein the third processor is located at the site.

4. The method of claim 1, wherein the at least one radio frequency identification tag is a tamper resistant radio frequency identification tag.

5. The method of claim 1, further comprising removing the encoded radio frequency identification tag from the traceable well equipment at the site for enabling reuse of the radio frequency identification tag.

6. The method of claim 1, wherein the at least one radio frequency identification tag is serialized.

7. The method of claim 1, wherein the transportable data storage device is an external memory storage device, an internal memory storage device, or combinations thereof.

8. The method of claim 1, wherein the at least specification information is a limited amount of information for improving communication speed between the smart controller and one of the processors.

9. The method of claim 8, wherein the limited amount of information comprises from three to five pieces of information, and wherein each piece of information is selected from the group consisting of: part number, size, job number, serial number, brand name, color, material, or combinations thereof.

10. The method of claim 1, wherein an additional processor is used to load the encoded information onto the at least one radio frequency identification tag.

11. The method of claim 10, wherein the additional processor is the smart controller.

12. The method of claim 1, wherein the destination is a member of the group consisting of: a well location, a work site, a manufacturing location, an assembly location, a storage area, a transport vehicle, or a holding area.

13. The method of claim 1, wherein the destination comprises at least one hydrocarbon well, at least one water well, at least one injection well, or combinations thereof.

14. The method of claim 1, wherein the at least one piece of well equipment is a member of the group consisting of: a manufactured bar of material, a tubular, a completion tool, a drilling tool, a buoy, a piece of pressure control equipment, a land well structure, a surface sea well structure, subsea well equipment, a well completion assembly, an oil or gas rig motor, an oil or gas meter, a piece of gas compression equipment, a piece of surface process equipment, or combinations thereof.

15. The method of claim 1, further comprising using a shipping device to hold the at least one piece of well equipment, wherein the shipping device is a member of the group consisting of a shipping module, a box, a crate, a basket, or a standardized intermodal shipping container.

* * * * *